United States Patent [19]
Bischoff et al.

[11] 3,802,272
[45] Apr. 9, 1974

[54] AUTOMATIC DISSOLUTION RATE DETERMINATOR

[75] Inventors: Dennis E. Bischoff, Indianapolis; David W. Skiles, Greenwood; Robert M. Brooker, Indianapolis, all of Ind.

[73] Assignee: The Dow Chemical Company, Midland, Mich.

[22] Filed: Jan. 24, 1973

[21] Appl. No.: 326,428

[52] U.S. Cl. .................. 73/432 R, 259/8
[51] Int. Cl. .......................... G01n 19/00
[58] Field of Search .......... 73/432 R, 86; 259/90, 8

[56] References Cited
UNITED STATES PATENTS
3,618,395  11/1971  Melliger .................. 73/432 R
3,572,648  3/1971   Hanson .................... 259/90

*Primary Examiner*—Donald O. Woodiel

[57] ABSTRACT

An automatic dissolution rate determinator for determining dissolution rates of pharmaceutical tablets, capsules or the like includes a plurality of dissolution test chambers connected by appropriate tubing and valves to an analyzer, with valving and control means for rapid sequential sampling of liquid dissolution test medium from each chamber.

5 Claims, 4 Drawing Figures

AUTOMATIC DISSOLUTION RATE DETERMINATOR

BACKGROUND OF THE INVENTION

The present invention is concerned with apparatus for automatic determination of dissolution rates. Various types of dissolution testing devices are described, for example, in U.S. Pat. Nos. 3,572,648 and 3,618,395; Burger and Nash, J. Pharm. Sci. 60, 300–302 (1971) and MacDonald et al., Clinical Medicine, December, 1969, pp. 30–33.

BRIEF SUMMARY OF THE INVENTION

This invention is concerned with apparatus for determining the dissolution rate of solid materials in liquids, and is particularly concerned with automatic apparatus for determining dissolution rates on a plurality of different solid materials. The apparatus includes a plurality of dissolution test chambers, connected via associated valves and tubing to an analyzer, means for operating the valves and tubing to supply a liquid sample from each chamber in a sequence to the analyzer and return the sample to its chamber, and means for back flushing the valves and tubing to minimize cross-interference between samples. The apparatus can also include additional groups of test chambers for automatically testing dissolution rates with a plurality of sets of sample material, and valve and control means for operatively coupling successive sets of chambers to the analyzer.

DETAILED DESCRIPTION OF THE INVENTION

Figure 1:
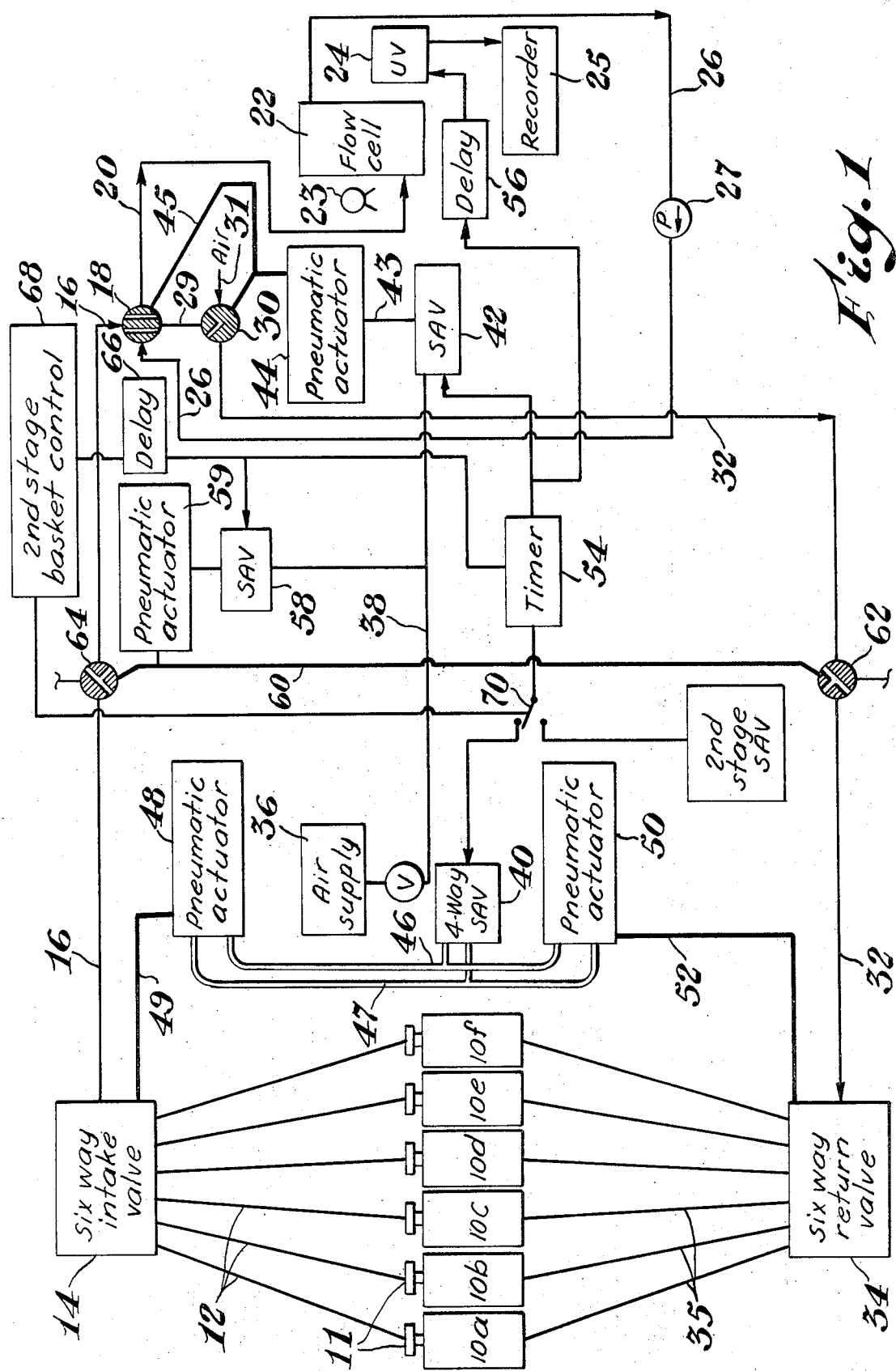
FIG. 1 is a schematic drawing of a dissolution rate determinator apparatus of the invention.

Referring more particularly to FIG. 1, the apparatus comprises six dissolution chambers 10 each connected via its respective intake tube 12 to a corresponding port of a six port intake valve 14. A screen 11 is provided in each intake tube 12 to trap undissolved solids. Valve 14 has a single output through a common intake tube 16 to one port of a four-way valve 18. Four-way valve 18 selectively communicates via a continuation 20 of the common intake tube 16 with a spectrophotometer flow cell 22. The concentration of the dissolved substance in flow cell 22 is measured by measuring the absorbance of light, e.g. from an ultraviolet lamp 23 with a spectrophotometer 24. The spectrophotometer is connected to a conventional recording device, e.g., strip chart recorder 25, to provide a permanent record of the measurements.

Flow cell 22 communicates with a third port of four-way valve 18 via a return tube 26. A conventional peristaltic pump 27 is provided on tube 26. During operation of the apparatus, peristaltic pump 27 is adapted to operate continuously, pumping fluid in line 26 from flow cell 22 toward valve 18, as indicated by the arrow.

The fourth port valve 18 communicates with a common port 29 of three-port valve 30. Three port valve 30 selectively provides communication between common port 29 and air intake port 31, or between port 29 and liquid return tube 32. Tube 32 selectively communicates with each chamber 10 individually via corresponding ports of a six-port return valve 34 and the corresponding six chamber return tubes 35.

Figure 2:
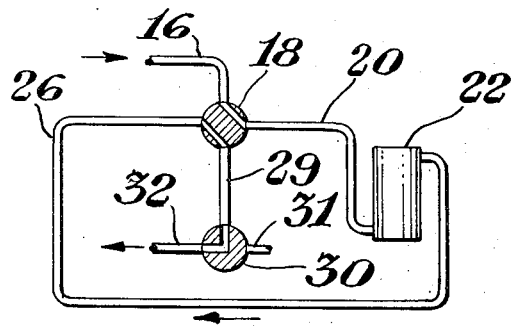
FIG. 2 is a schematic drawing illustrating the operation of valves 18 and 30 during a forward mode of operation of the apparatus of FIG. 1.
Figure 3:
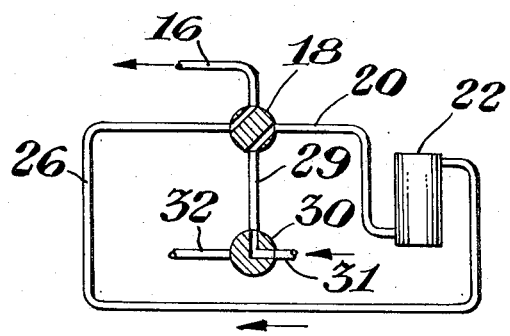
FIG. 3 is a schematic drawing illustrating operation of valves 18 and 30 during a back-flushing mode.

Valves 18 and 30 are adapted to alternate between a forward mode illustrated in FIG. 2 and a back-flush mode illustrated in FIG. 3. They are preferably mounted in tandem for simultaneous operation. In the forward mode (FIG. 2), intake tube 16 is coupled to tube 20 via valve 18, and return tube 26 is coupled through valve 18 to port 29 of valve 30, and thence to return tube 32. In this mode, fluid flow is in the direction indicated by the arrows in FIG. 2 and air flow is cut off at port 31.

In the reverse, back-flush mode, air intake port 31 of valve 30 is coupled via common port 29 and valve 18 to tube 20 and flow cell 22. The return tube 26 from the flow cell 22 is coupled via valve 18 to intake tube 16. In this mode, fluid flow of the liquid and an air wash is in the direction indicated by arrows in FIG. 3, and return tube 32 is closed at valve 30. The back flushing operation serves to prevent carry over of solution from one chamber 10 to the next, and to clear screens 11 of solid particulate material which may accumulate during dissolution studies. Such accumulations of solid material can foul the screens 11, particularly at high flow rates involved. When the solid material includes undissolved particles of the substance being analyzed, the dissolution rate determinations can be distorted due the accumulation of such material at the screens 11. The back-flushing operation minimizes these difficulties.

During the back-flush phase, a portion of the dissolution test medium 84 can remain in return tube 32 between valves 30 and 34. The potential cross-over of such liquid portions from one chamber, e.g. 10a, to the next, e.g. 10b, can be reduced to volumes which are negligible for most operations by constructing the apparatus so that the internal volume of return tube 32 is minimized. Cross-over of such portions can also be minimized by employing conventional delay means to actuate six-way return valve 34 a predetermined time interval after actuation of intake valve 14, such interval being selected so that valve 34 is actuated to connect tube 32 to the next sample return tube 35 at a time when tube 32 and valve 34 are filled with air introduced during the back-flush mode.

The dissolution chambers 10 can be resin kettles with basket stirrers of the type described in U.S. Pat. No. 3,572,648, with multiple spindle stirrer drive of the type manufactured by Hanson Research Corp., Northridge, California. Alternatively, other devices for providing continuous uniform exposure to a solvent can be employed.

VALVE ACTUATION

Valves 14, 18, 30 and 34 are actuated by an electrically-controlled pneumatic actuator system. As illustrated in FIG. 1, the apparatus includes a high-pressure air supply 36 coupled via air pressure conducting line 38 to a first air valve, e.g., four-way, solenoid-operated air valve (SAV) 40 and a second air valve SAV 42. A pressure regulating valve 41 is connected in line 38 between the supply 36 and the SAV's 40, 42 to provide a convenient operating pressure. SAV 42 is coupled via air line 43 to a pneumatic actuator 44, which can be a conventional spring-returned, piston and cylinder actuator. Actuator 44 is mechanically linked to valves 30 and 18 (the linkage being illustrated by the heavy solid line 45 in FIG. 1) to operate valves 18, 30 simultaneously between the modes illustrated in FIGS. 2 and 3. Four-way SAV 40 is coupled via air lines 46, 47 to pneumatic actuators 48, 50, each of the air lines 46, 47 being coupled to both actuators 48, 50. The actuators 48, 50 are mechanically linked to a corresponding six-port valve 14, 34 by conventional mechanical linkages (illustrated by heavy lines 49, 52) adapted to operate the valves 14, 34 from one port to the next. For example, with a rotary six-port valve 14, a pawl and ratchet wheel linkage is a suitable arrangement.

MEANS FOR CONTROLLING OPERATION

The automatic dissolution rate analyzer of the invention also includes means for controlling the sequence of operations, e.g., a timer 54, which is electrically connected to the solenoid air valves 40, 42, and, to the spectrophotometer 24 via a time delay relay 56. The timer output via SAV 40 and other actuator means operates the six-way valves 14, 34 to communicate with the same dissolution chamber 10 for a pre-determined time interval, before both valves 14, 34 are operated to communicate with the next chamber. Simultaneously with the operation of valves 14, 34, the timer output to SAV 40 and delay relay 56 directs simultaneous operation of valves 18, 30 to the forward mode (FIG. 2) and after a delay determined by relay 56, actuates spectrophotometer 24. After a predetermined interval the output from timer 54, via SAV 42, controls operation of valves 18, 30 to the back-flush mode (FIG. 3), simultaneously deactivating spectrophotometer 24 and resetting relay 56, in preparation for the next sampling cycle.

The delay relay is pre-set to delay measurement by the spectrophotometer for a predetermined time interval after valves 18, 30 are actuated to the forward mode. The time interval is selected to permit dissolution media liquid from a dissolution chamber 10 to be drawn into flow cell 22. The spectrophotometer 24 is thus prevented from measuring absorbance in flow cell 22 during air flushing. Since the recorder 25 responds to the spectrophotometer output, the timed control via delay relay 56 also serves to provide a sharp demarcation between different results in the recorded output.

Timer 54 is also adapted to control a second stage of dissolution chambers. As illustrated in FIG. 1, a third solenoid operated air valve 58, pneumatic actuator 59 and mechanical linkage 60 are provided to operate a three-way valve 62 in return tube 32 and a three-way valve 64 in intake tube 16. These valves 62, 64 are adapted to disconnect valves 14, 34 and chambers 10 from further sampling and measurement and to communicate with a second stage of six port intake and return valves 114 and 134, respectively, and an associated set of dissolution chambers, tubes and screens. The second stage of valves, chambers, tubes, etc. is essentially the same as that illustrated in FIG. 1 and is therefore not shown.

The timer output connected to SAV 58 is also connected via a delay relay 66 to a second stage dissolution chamber control 68 and to a switch 70. Switch 70 is provided in the switch timer 54 from four-way SAV 40 to a corresponding SAV 140 for operating the six-way valves 114, 134 of the second stage.

THE DISSOLUTION CHAMBERS

Figure 4:
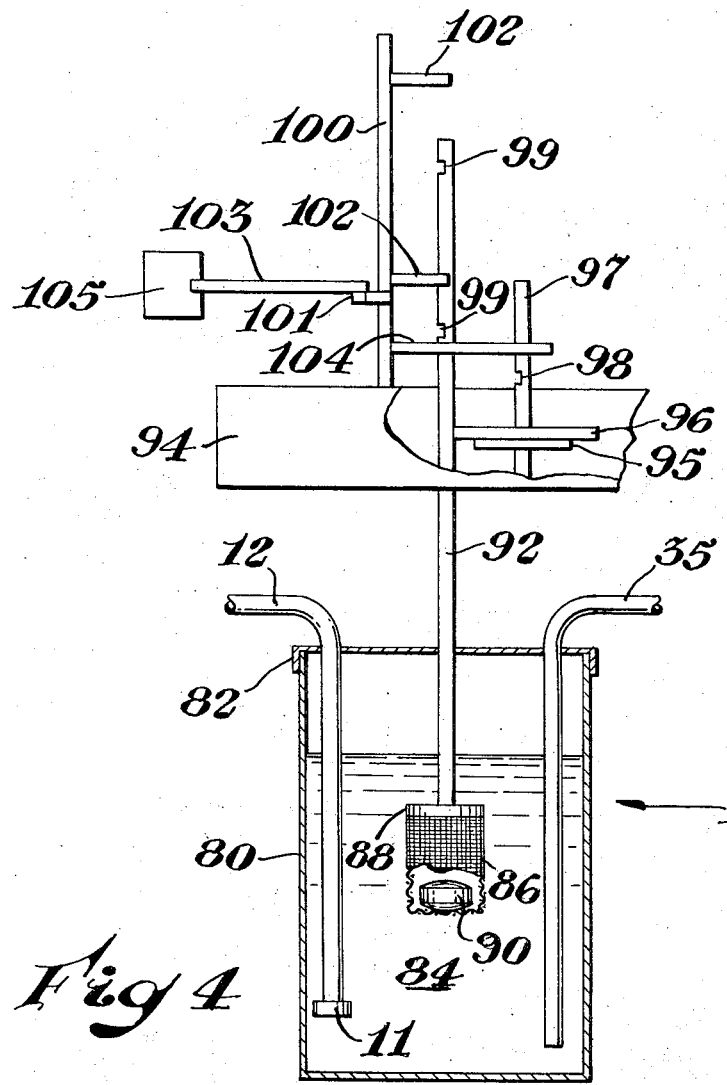
FIG. 4 illustrates a test chamber 10 of FIG. 1.

The dissolution chambers 10, as illustrated in FIG. 4 comprise a kettle 80 and a cover 82, for containing a liquid dissolution test medium 84. Kettle 80 is mounted in a constant temperature bath (not shown). Intake tube 12, screen 11 and return tube 35 are disposed in the kettle 80 below the level of medium 84. Disposed in kettle 80 is a mesh screen basket 86 containing a tablet 90. Basket 86 is attached to basket cover 88 and spindle 92, so that basket 86 can be raised and lowered in and out of medium 84 by spindle 92.

Spindle 92 is rotatably mounted in a frame 94. A drive wheel 95 is mounted in frame 94 driven by a motor (not shown), as is a clutch plate wheel 96 which has an upwardly extending shaft 97. Wheel 96 is selectively engageable with spindle 92 and drive wheel 95 to rotate the spindle 92 and basket 86. A control rod 100 is rotatably mounted on frame 94. Rod 100 carries a pair of spindle support arms 102 adapted to engage a corresponding pair of notches 99 in spindle 92 to support spindle 92 in a raised position in which the basket 86 is above medium 84. Rod 100 also includes a clutch arm 104 adapted to engage a corresponding notch 98 on shaft 97 to support clutch wheel 96 in a position disengaged from drive wheel 95. Control rod is also connected via suitable operating means, e.g., pivot arm 101, rod 103 and solenoid 105, to a starting switch (not shown) which also starts the timer. (In the case of a second stage dissolution chamber, the second stage control comprises the control rod 100 and solenoid 105 and would be connected to delay relay 66.)

The dissolution chambers 10 have been described with respect to a single chamber only for the sake of simplicity. It will be immediately apparent that multiple chambers 10, spindles 92, control rods 100, etc., are similarly constructed.

A representative apparatus of the invention was constructed using a single stage of dissolution chambers 10 (Hanson Research Corp., Model 72) with six baskets and individual clutches and a double beam spectrophotometer 24 (Bausch & Lomb Spectronic 505) with 1 centimeter fused silica flow cell 22 and a strip chart recorder 25. 0.060 Inch inside diameter polytetrafluoroethylene tubing was used for tubes 12, 16, 20, 26, 29, 32, 35, tubing lengths being selected so that the total internal volume from tube 12 to tubes 35 including valves 14, 18, 30, 34 and the flow cell 22 was about 8 to 15 milliliters. In operation the pump 27 was operated to move solutions through the apparatus at rates from about 80 to about 150 milliliters per minute, a constant rate being employed for the duration of each analysis. The screens 11 are stainless steel screens, 325 × 325 mesh mounted in polystyrene mesh canisters attached to the ends of each tube 12. The canisters can contain an ion exchange resin to remove interfering ions, such as excipients and dyes, from the solution.

In a representative dissolution analysis, a 500 milligram sulfisoxazole U.S.P. tablet is placed in each basket 86. 900 Milliliters of 1 Normal aqueous hydrochloric acid is placed in each kettle 80 as a dissolution medium 84 and the 1N hydrochloric acid is also used as a medium for the reference cell for the spectrophotometer 24. The dissolution chambers 10 are maintained at 37° C. by means of a water bath. The timer is preset for test cycles of about 90 seconds with each chamber 10, i.e., valves 14 and 34 connect tubes 16 and 32, respectively, to chamber 10a for 90 seconds, then to chambers 10b to 90 seconds and so on through 10f and then repeating the operation beginning with chamber 10a, 10b, etc. In the 90 second cycle, timer 54 is also set to provide a back flush mode of about 2 to 5 seconds duration, and delay relay 56 is adjusted for a delay of about 1 to 5 seconds. The pump 27 operates continuously at a constant rate of about 120 milliliters per minute. Using a strip chart recorder for recorder 25 the records obtained show a clear separation between sample peaks resulting from different tablets. In another mode of operation, the timer 54 can be disconnected, and a single chamber monitored continuously for a continuous study of dissolution.

OPERATION OF THE APPARATUS

In carrying out a dissolution study with the apparatus of the invention, the kettles 80 of chambers 10 are charged with a selective dissolution medium, for example, simulated gastric juice. Specimens to be analyzed, e.g., pharmaceutical tablets, capsules, or other solid object to be analyzed are loaded into each basket 86 and the chambers 10 are closed, brought to a desired temperature, and otherwise prepared for the dissolution study in accordance with known procedures. When the apparatus is activated, the basket 86 for chamber 10a is lowered into the medium 84 and begins rotating. At this time both valves 14, 34 are connected to chamber 10a, and valves 18 and 30 are in the forward mode. During the first phase or forward mode of the operating cycle, medium 84 is continuously pumped through screen 11, tubes 12, 16 and 20 through the flow cell 22 and returned to chamber 10a through tubes 26, 32 and 35 and valves 18, 30 and 34. The direction of liquid flow during this phase of the operating cycle is indicated by the arrows in FIG. 1. After a time interval sufficient for the liquid to reach flow cell 22 the spectrophotometer 24 is activated by delay relay 56, and the recorder 25 begins recording the measurement of the dissolved ingredient. After a predetermined time interval, controlled by timer 54, valves 18, 30 are actuated to the back flush mode (FIG. 3). Air is then pumped through valves 18, 23 and tubes 20, 26 and back through tubes 16, 12 and screen 11. During this phase the dissolution medium upstream of line 32 is returned to chamber 10a and the screen 11 is flushed clear of any particles of disintegrated but not dissolved tablet material. The introduction of air during the back flush phase also serves as an air wash of the tubing, valves and flow cell, thus helping to minimize any cross-over of material between one chamber 10 and the next.

At the end of the second, back flush, phase of the cycle the six-way valves 14, 34 are actuated by the SAV 40, pneumatic actuators 48, 50 and mechanical linkages 49, 52, connecting valves 14, 34 to the next chamber 10b. The identical cycle is then repeated through chamber 10b and carried out on the remaining chambers successively. After the cycle has been completed with the last chamber 10f, the apparatus repeats the series of cycles again. The sampling cycles can be repeated as often as desired. In most instances it would be desired to continue the repetitions for a limited amount of time and the timer employed can be selected to carry out only a pre-selected number of repetitions. Alternatively, the apparatus can be modified by the addition of conventional memory storage and logic circuits to monitor the outputs from spectrophotometer 24, compare the output for a given chamber 10 with the output generated during a preceding cycle, and to terminate the operation of the apparatus when the spectrophotometer outputs reach a stable level from one cycle to the next. When the cycle repetition is completed, valves 62, 64, switch 70 and second stage basket control 68 are actuated to begin identical series of operations with a second set of dissolution chambers.

The duration of the forward and back flush phase of an operating cycle, the delay time provided by relay 56, the flow rate of liquid through the tubes and valves, etc., and the internal volume of the tubes, valves and flow cell are interrelated and inter-dependent. Thus, when the apparatus shifts to a forward mode of operation, relay 56 should provide a sufficient delay for the liquid medium 84 to reach and fill flow cell 22, and for activating spectrophotometer 24. Since the liquid material in flow cell 22 at this time has been previously separated from undissolved particles by screen 11, the spectrophotometer measurement reflects the actual consideration of dissolved ingredient in chamber 10 at the time the medium 84 entered tube 12. The apparatus is preferably operated at high fluid flow rates and low internal volumes so that several volumes of liquid are passed through the flow cell during each cycle. The high speed operation greatly reduces the time lag between sample withdrawal and measurement, and permits almost contemporaneous monitoring of the dissolution rate.

Since the material withdrawn for analysis is almost continuously being returned to the same dissolution chamber 10 the apparatus minimizes errors due to reduction of the volume of medium during a lengthy analysis. Duration of the back flush phase of the operating cycle should be sufficient to return all the medium 84 upstream of valve 30 to its chamber 10a, in order to minimize crossover between dissolution chambers. With a flow rate (in milliliters per minute) several times (e.g. 5 to 20 times) the internal volume (from screen 11 through return tube 35, in milliliters), the back flush phase can be quite short in duration, e.g., on the order of 1 to 3 seconds. The forward phase can be as long as desired, the minimum duration of the forward phase being limited primarily by factors such as the flow rate of medium 84 to the flow cell 22 and the response time requirements of the spectrophotometer 24 and recorder 25. In general it is desirable to employ a forward phase several seconds longer than the back flush phase, to insure sufficient time for the spectrophotometer 24 and recorder 25 to give an accurate response.

What is claimed is:

1. In a dissolution rate testing apparatus comprising a plurality of dissolution test chambers for containing a liquid medium and a solid test material to be dissolved therein, an analyzer for analyzing the quantity of test material dissolved in the liquid medium, and sampling means including valves, tubes and a pump for sequentially transporting a liquid medium sample from each test chamber to the analyzer and returning said sample to its corresponding test chamber through a return tube, and control means for operating said sampling means to sample each test chamber in a predetermined, timed sequence; the improvement wherein:

the sampling means includes a plurality of sample intake tubes, a sample intake tube being disposed in each test chamber in communication with the liquid medium therein;

screening means in each dissolution chamber for preventing undissolved solid test material from entering the intake tube associated therewith; and back-flush means; including a valve coupled to the sampling means, for selectively reversing the direction of fluid flow in each intake tube.

2. Apparatus of claim 1 wherein the pump is adapted to maintain continuous, unidirectional fluid flow in a unidirectional flow tube portion of the sampling means; and wherein the back flush means includes valve means selectively communicating with said tube portion, with selected intake and return tubes, and with a source of a back-flush fluid, said valve means being operable between a forward mode in which the selected intake tube is communicably coupled upstream of the pump and through the unidirectional flow tube portion to the selected return tube, and a back-flush mode in which the source of back-flush fluid is communicably coupled upstream of the pump and through the unidirectional flow tube portion to the intake tube.

3. Apparatus of claim 2, further comprising an intake valve having an outlet port and a plurality of inlet ports, each inlet port communicatively coupled to corresponding intake tube, a first back-flush valve having a first port communicably coupled to the outlet port of the intake valve, a second port communicably coupled to an upstream portion of the unidirectional flow tube, a third port communicably coupled to a downstream portion of the unidirectional flow tube and a fourth port;

a second back flush valve having a first port communicatively coupled to the fourth port of the first back flush valve to selectively communicate with a second port vented to air and a third port communicatively coupled to a selected return tube; and means for simultaneously operating both back flush valves between a forward mode in which the first and second ports, and the third and fourth ports of the first valve communicate and the first port of the second valve communicates with the third port thereof; and a back flush mode wherein the first and third ports and the second and fourth ports of the first valve communicate and the first port of the second valve communicates with the second port thereof.

4. Apparatus of claim 3 wherein the analyzer comprises a spectrophotometer and a flow cell in the unidirectional flow tube, and wherein the control means comprises means for deactivating the spectrophotometer during the back-flush phase.

5. Apparatus of claim 4 wherein the control means comprises a timer having first output operatively connected to the intake valve to selectively, sequentially couple each intake tube to the first back flush valve for a predetermined sampling time interval, and a second output operatively connected to the back-flush valve operating means for operating the back-flush valves through both phases of operation during each sampling time interval.

* * * * *